(12) United States Patent
Fulton

(10) Patent No.: US 9,054,565 B2
(45) Date of Patent: Jun. 9, 2015

(54) ELECTRIC MACHINE COOLING SYSTEM AND METHOD

(75) Inventor: David A. Fulton, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 654 days.

(21) Appl. No.: 13/153,865

(22) Filed: Jun. 6, 2011

(65) Prior Publication Data
US 2011/0298315 A1    Dec. 8, 2011

Related U.S. Application Data

(60) Provisional application No. 61/351,755, filed on Jun. 4, 2010.

(51) Int. Cl.
*H02K 9/19* (2006.01)
*H02K 5/20* (2006.01)

(52) U.S. Cl.
CPC ... *H02K 9/19* (2013.01); *H02K 5/20* (2013.01)

(58) Field of Classification Search
USPC ...................................................... 310/54, 58
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 3,447,002 A | 5/1969 | C. Ronnevig | |
| 3,525,001 A | 8/1970 | Erickson | |
| 3,645,112 A * | 2/1972 | Mount et al. ..................... | 62/505 |
| 3,675,056 A * | 7/1972 | Lenz ............................... | 310/54 |
| 3,748,507 A | 7/1973 | Sieber | |
| 4,038,570 A | 7/1977 | Durley, III | |
| 4,647,805 A * | 3/1987 | Flygare et al. .................. | 310/61 |
| 5,081,382 A | 1/1992 | Collings et al. | |
| 5,180,004 A | 1/1993 | Nguyen | |
| 5,207,121 A | 5/1993 | Bien | |
| 5,293,089 A | 3/1994 | Frister | |
| 5,372,213 A | 12/1994 | Hasebe et al. | |

(Continued)

FOREIGN PATENT DOCUMENTS

| | | | | |
|---|---|---|---|---|
| DE | 10122425 | * | 6/2006 | ............... H02K 9/02 |
| JP | 05-103445 A | | 4/1993 | |

(Continued)

OTHER PUBLICATIONS

International Search Report, Received Jan. 9, 2012.

(Continued)

*Primary Examiner* — Burton Mullins
(74) *Attorney, Agent, or Firm* — Greenberg Traurig, LLP

(57) ABSTRACT

Embodiments of the invention provide an electric machine module including a housing. In some embodiments, the housing can include a sleeve member coupled to at least one end cap. The housing can include an inner wall at least partially defining a machine cavity, a coolant sump, and at least one coolant channel positioned between the inner wall and an outer wall of the housing. In some embodiments, the coolant channel can be in fluid communication with the coolant sump. In some embodiments, an electric machine can be positioned in the machine cavity. The electric machine can comprise a stator assembly including stator end turns and a rotor assembly. In some embodiments, a coolant jacket can be at least partially defined by the housing and can be positioned so that to at least partially circumscribe a portion of the stator assembly.

20 Claims, 2 Drawing Sheets

(56) References Cited

U.S. PATENT DOCUMENTS

| | | |
|---|---|---|
| 5,519,269 A | 5/1996 | Lindberg |
| 5,698,912 A | 12/1997 | Rasch et al. |
| 5,859,482 A | 1/1999 | Crowell et al. |
| 5,906,236 A * | 5/1999 | Adams et al. ............... 165/46 |
| 5,923,108 A | 7/1999 | Matake et al. |
| 5,937,817 A | 8/1999 | Schanz et al. |
| 5,965,965 A | 10/1999 | Umeda et al. |
| 6,011,332 A | 1/2000 | Umeda et al. |
| 6,069,424 A | 5/2000 | Colello et al. |
| 6,075,304 A | 6/2000 | Nakatsuka |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag |
| 6,313,559 B1 | 11/2001 | Kusase et al. |
| 6,333,537 B1 | 12/2001 | Arita |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Masegi |
| 6,559,572 B2 | 5/2003 | Nakamura |
| 6,561,155 B1 | 5/2003 | Williams |
| 6,579,202 B2 * | 6/2003 | El-Antably et al. ........... 475/159 |
| 6,770,999 B2 | 8/2004 | Sakurai |
| 6,822,353 B2 * | 11/2004 | Koga et al. ............... 310/64 |
| 6,897,594 B2 | 5/2005 | Ichikawa et al. |
| 6,903,471 B2 | 6/2005 | Arimitsu et al. |
| 6,914,354 B2 * | 7/2005 | Seniawski et al. ............... 310/58 |
| 6,998,749 B2 | 2/2006 | Wada et al. |
| 7,002,267 B2 | 2/2006 | Raszkowski et al. |
| 7,026,733 B2 | 4/2006 | Bitsche et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,939,975 B2 | 5/2011 | Saga et al. |
| 8,067,865 B2 | 11/2011 | Savant |
| 8,068,327 B2 | 11/2011 | Seifert et al. |
| 8,803,380 B2 * | 8/2014 | Chamberlin et al. ............ 310/54 |
| 2003/0222519 A1 | 12/2003 | Bostwick |
| 2004/0036367 A1 | 2/2004 | Denton et al. |
| 2004/0189110 A1 | 9/2004 | Ide |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0168796 A1 * | 7/2008 | Masoudipour et al. ......... 62/505 |
| 2008/0223557 A1 | 9/2008 | Fulton et al. |
| 2009/0102298 A1 * | 4/2009 | Savant et al. ............... 310/52 |
| 2009/0121562 A1 * | 5/2009 | Yim ............... 310/54 |
| 2009/0174278 A1 | 7/2009 | Sheaffer et al. |
| 2009/0184591 A1 * | 7/2009 | Hoshino et al. ............... 310/54 |
| 2009/0206687 A1 | 8/2009 | Woody et al. |
| 2010/0026111 A1 | 2/2010 | Monzel |
| 2010/0102649 A1 | 4/2010 | Cherney et al. |
| 2010/0109454 A1 | 5/2010 | Vadillo et al. |
| 2010/0164310 A1 * | 7/2010 | Dames et al. ............... 310/54 |
| 2010/0176668 A1 | 7/2010 | Murakami |
| 2010/0194214 A1 * | 8/2010 | Takahashi et al. ............... 310/43 |
| 2010/0283334 A1 * | 11/2010 | Lemmers et al. ............... 310/54 |
| 2011/0050141 A1 | 3/2011 | Yeh et al. |
| 2011/0101700 A1 | 5/2011 | Stiesdal |
| 2011/0109095 A1 | 5/2011 | Stiesdal |
| 2011/0148229 A1 * | 6/2011 | Esse ............... 310/54 |

FOREIGN PATENT DOCUMENTS

| | | |
|---|---|---|
| JP | 05-292704 A | 11/1993 |
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

(56) References Cited

OTHER PUBLICATIONS

International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.
International Search Report dated Mar. 8, 2012.
International Search Report, Received Jul. 31, 2012.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.

* cited by examiner

ELECTRIC MACHINE COOLING SYSTEM AND METHOD

RELATED APPLICATIONS

This application claims priority under 35 U.S.C. §119 to U.S. Provisional Patent Application No. 61/351,755 filed on Jun. 4, 2010, the entire contents of which is incorporated herein by reference.

BACKGROUND

Some conventional methods for cooling an electric machine include passing a coolant around a perimeter of the electric machine. The coolant extracts heat from portions of the electric machine, which can lead to electric machine cooling. The configuration of some conventional electric machines can lead to at least partially reduced heat rejection efficiency from different machine elements, such as a stator assembly. In addition, some elements of the machine that can conduct heat energy, such as the stator assembly, may not be properly configured to more efficiently conduct heat energy, which can result in an interface resistance.

Some conventional machines may also conduct heat energy through a rotor assembly. For example, if the machine's rotor assembly generates a significant amount of heat energy, which is common with some electric machines, the rotor assembly heat can be conducted through the machine's shaft and bearings or lost by forced convection to the internal air within the housing. Conducting heat through the bearings can reduce for bearing life, and the conduction resistance of this path can be generally high. Also, the convection resistance from the internal air to the machine's housing can be generally high, which makes this a generally ineffective way to reject heat from the rotor assembly.

SUMMARY

Some embodiments of the invention provide an electric machine module including a housing. In some embodiments, the housing can include a sleeve member coupled to at least one end cap. In some embodiments, the housing can include an inner wall at least partially defining a machine cavity, a coolant sump, and at least one coolant channel positioned between the inner wall and an outer wall of the housing. In some embodiments, the coolant channel can be in fluid communication with the coolant sump. In some embodiments, an electric machine can be positioned in the machine cavity. The electric machine can comprise a stator assembly including stator end turns and a rotor assembly. In some embodiments, a coolant jacket can be at least partially defined by the housing and can be positioned so that it at least partially circumscribes a portion of the stator assembly.

Some embodiments of the invention provide an electric machine module including a housing. In some embodiments, the housing can include a sleeve member coupled to at least one end cap. In some embodiments, the housing can include an inner wall at least partially defining a machine cavity, a coolant sump, and at least one coolant channel positioned between the inner wall and an outer wall of the housing. In some embodiments, the coolant sump can be configured and arranged to contain at least a portion of a second coolant. In some embodiments, the coolant channel can be in fluid communication with the coolant sump via a coolant inlet and can be in fluid communication with the machine cavity via at least one coolant aperture. In some embodiments, an electric machine can be positioned in the machine cavity. The electric machine can comprise a stator assembly including stator end turns and a rotor assembly. In some embodiments, an outer member can be coupled to a portion of the housing to define at least a portion of a coolant jacket. In some embodiments, the coolant jacket can be configured and arranged to contain a portion of a first coolant and can be in thermal communication with at least a portion of the coolant jacket.

DETAILED DESCRIPTION

Figure 1:
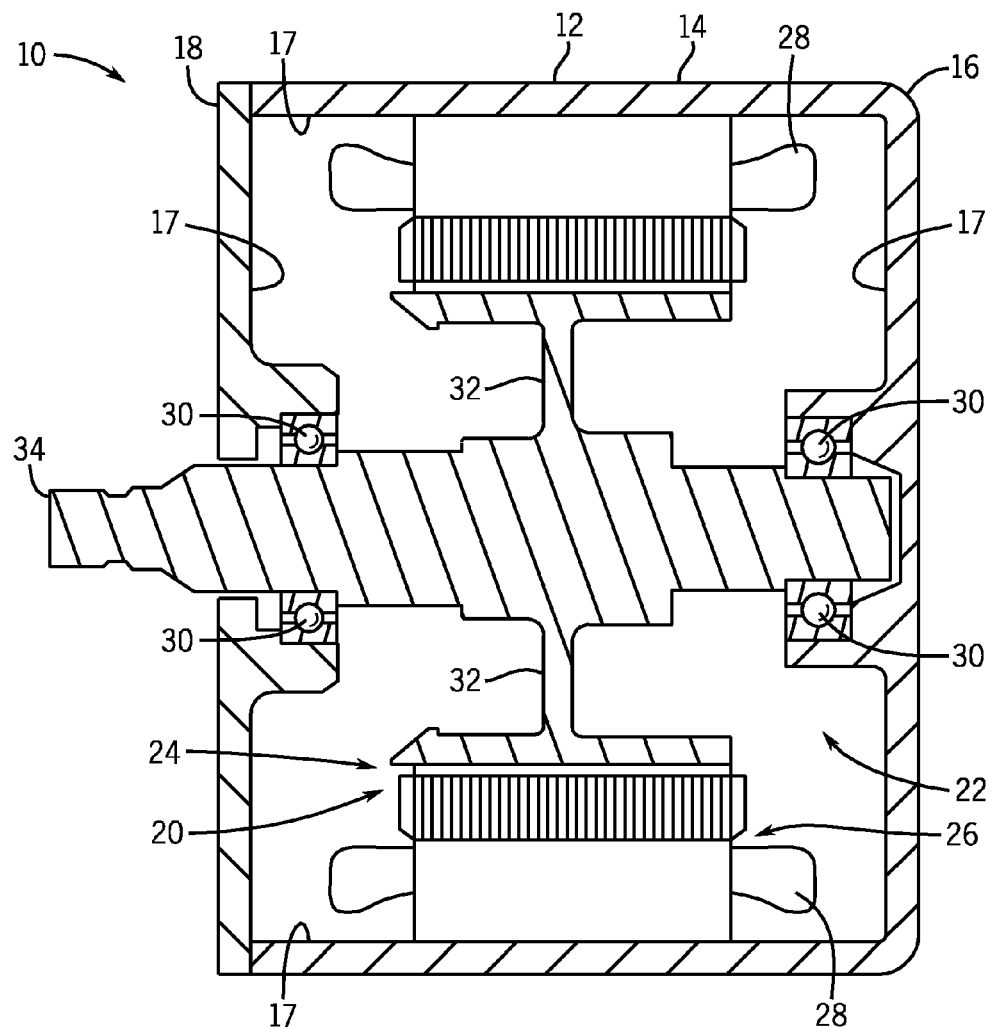
FIG. 1 is a cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates an electric machine module 10 according to one embodiment of the invention. The module 10 can include a housing 12 comprising a sleeve member 14, a first end cap 16, and a second end cap 18. An electric machine 20 can be housed within a machine cavity 22 at least partially defined by the an inside wall 17 of portions of the housing 12. For example, the sleeve member 14 and the end caps 16, 18 can be coupled via conventional fasteners (not shown), or another suitable coupling method, to enclose at least a portion of the electric machine 20 within the machine cavity 22. In some embodiments the housing 12 can comprise a substantially cylindrical canister and a single end cap (not shown). Further, in some embodiments, the housing 12, including the sleeve member 14 and the end caps 16, 18, can comprise materials that can generally include thermally conductive properties, such as, but not limited to aluminum or other metals and materials capable of generally withstanding operating temperatures of the electric machine. In some embodiments, the housing 12 can be fabricated using different methods including casting, molding, extruding, and other similar manufacturing methods.

The electric machine 20 can be, without limitation, an electric motor, such as a hybrid electric motor, an electric generator, a vehicle alternator, and/or an induction belt-alternator-starter (BAS). In one embodiment, the electric machine 20 can be a High Voltage Hairpin (HVH) electric motor or an interior permanent magnet electric motor for hybrid vehicle applications.

The electric machine 20 can include a rotor assembly 24, a stator assembly 26, including stator end turns 28, and bearings 30, and can be disposed about an output shaft 34. As shown in FIG. 1, the stator 26 can substantially circumscribe a portion of the rotor 24. In some embodiments, the electric machine 20 can also include a rotor hub 32 or can have a "hub-less" design (not shown).

Components of the electric machine 20 such as, but not limited to, the rotor assembly 24, the stator assembly 26, and the stator end turns 28 can generate heat during operation of the electric machine 20. These components can be cooled to increase the performance and the lifespan of the electric machine 20.

Figure 2:
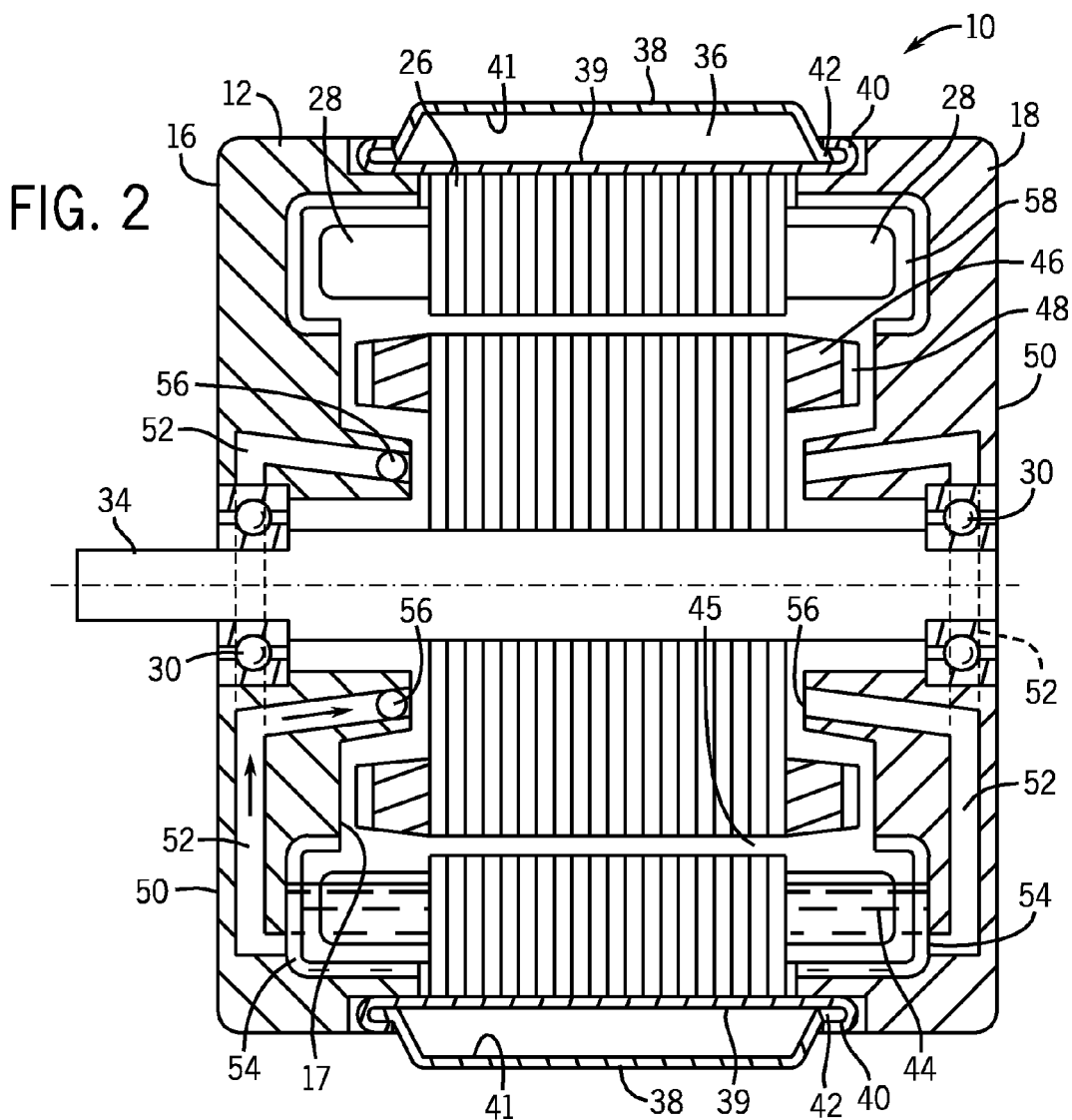
FIG. 2 is a cross-sectional view of an electric machine module according to one embodiment of the invention.

In some embodiments, as shown in FIG. 2, the housing 12 can comprise a coolant jacket 36. In some embodiments, the sleeve member 14 can comprise the coolant jacket 36. For example, in some embodiments, the coolant jacket 36 can be positioned substantially within the sleeve member 14 (e.g., formed so that the coolant jacket 26 is substantially integral with the sleeve member 14). As shown in FIG. 2, in some embodiments, the coolant jacket 36 can be defined between an outer perimeter 39 the sleeve member 14 and an inner perimeter 41 of an outer member 38. In some embodiments, the outer member 38 can be coupled to the sleeve member 14. For example, as shown in FIG. 2, in some embodiments, the sleeve member 14 can comprise recesses 40 configured and arranged to engage flanges 42 on the outer member 38. In some embodiments, the flanges 42 and recesses 40 can be interference fit together to couple the sleeve member 14 and the outer member 38. In other embodiments, the sleeve member 14 and the outer member 38 can be coupled together using conventional fasteners, adhesives, welding, brazing, etc. In some embodiments, in addition to or in lieu of the interference fit between the flanges 42 and the recesses 40, the sleeve member 14 and the outer member 38 can be coupled together in any combination of the previously mentioned coupling techniques. Moreover, in some embodiments, the interfaces between the sleeve member 14 and other structures can be substantially sealed with a gasket or similar structure.

Additionally, in some embodiments, the coolant jacket 36 can be defined between the outer perimeter 39 of the sleeve member 14 and an additional housing into which the electric machine module 10 can be installed (now shown). For example, in some embodiments, the module 10 can be installed within a motor housing, a transmission housing, or another housing for use in downstream applications. As a result, in some embodiments, the coolant jacket 36 can be defined between the additional housing and the sleeve member 14. In some embodiments, the coolant jacket 36, can be substantially adjacent to portions of the electric machine 20. For example, in some embodiments, the coolant jacket 36 can substantially circumscribe at least a portion of the stator assembly 26, as shown in FIG. 2.

In some embodiments, the coolant jacket 36 can comprise a first coolant, such as transmission fluid, ethylene glycol, an ethylene glycol/water mixture, water, oil, a cooling gas, a cooling mist, or another substance configured to receive heat energy. In some embodiments, the housing 12 can comprise at least one coolant inlet (not shown) so that the coolant jacket 36 can be in fluid communication with a fluid source (not shown) which can pressurize the first coolant prior to or as it is being dispersed into the coolant jacket 36. As a result, in some embodiments, the pressurized first coolant can circulate through at least a portion of the coolant jacket 36. In some embodiments, heat energy generated by the electric machine 20 can be transferred to the first coolant as it circulates through the coolant jacket 36, as described below, which can lead to at least partial cooling the electric machine 20. In some embodiments, after circulating through the coolant jacket 36, the first coolant can be directed to a heat transfer element (e.g., a radiator, a heat exchanger, etc.) via a coolant outlet (not shown), which can remove the heat energy from the first coolant.

Also, in some embodiments, the coolant jacket 36 can be substantially fluid-tight. For example, in some embodiments, regardless of the housing 12 configuration to define the coolant jacket 36, the coolant jacket 36 can be substantially fluid-tight so that no substantial amounts of the first coolant can enter or exit the coolant jacket 36 other than through the coolant inlet or the coolant outlet. In some embodiments, the sleeve member 14 can comprise a plurality of sleeve member coolant apertures (not shown) so that the coolant jacket 36 can be in fluid communication with the machine cavity 22. For example, in some embodiments, the coolant apertures can be positioned substantially radially outward from the stator end turns 28 so that at least a portion of the coolant circulating through the coolant jacket 36 can enter the machine cavity 22 and impinge upon the stator end turns 28 to receive a portion of the heat energy produced by the end turns 28.

In some embodiments, the module 10 can comprise at least one coolant sump 44. In some embodiments, the coolant sump 44 can be located substantially at or near a bottom portion of the machine cavity 22, as shown in FIG. 2. In some embodiments, the inner wall 17 of the housing 12 can be configured and arranged to define at least a portion of the coolant sump 44. For example, in some embodiments, the inner wall 17 of the housing 12 (e.g., the inner wall of the end caps 16, 18, the canister, and/or the single end cap) can be configured to at least receive portions of the electric machine 20 and define the coolant sump 44.

In some embodiments, the coolant sump 44 can be configured and arranged to include a second coolant. In some embodiments, the second coolant can comprise oil, vaporizable dielectric fluid, an oil/vaporizable dielectric fluid mixture, or another substance. In some embodiments, during operation of the electric machine 20, a resting level of the second coolant present in the coolant sump 44 can generally be below an air gap 45 between the rotor assembly 24 and the stator assembly 26, as shown in FIG. 2. Additionally, in some embodiments, the coolant sump 44 can be substantially sealed with respect to an environment outside of the module 10. For example, in some embodiments, the second coolant within the coolant sump 44 can remain substantially within the module 10 so that the second coolant loop, as described in more detail below, can be substantially self-contained within the module 10.

In some embodiments, the second coolant can be dispersed in different manners throughout the module 10. For example, in some embodiments, the rotor assembly 24 can comprise at least two axial ends substantially opposing one another. In some embodiments, one or more end rings 46 can be coupled to the rotor assembly 24 so that the end rings 46 are substantially adjacent to one or both of the axial ends of the rotor assembly 24. In some embodiments, the end rings 46 can be coupled to the rotor assembly 24 in different manners, including, but not limited to, conventional fasteners, welding, brazing, adhesives, hot staking, being pressed into the rotor assembly 24 lamination stack, etc. As a result, in some embodiments, the end rings 46 can be securely coupled to the rotor assembly 24. In some embodiments, at least one centrifugal pump 48 can be coupled to at least one of the end rings 46 and/or the rotor assembly 24. In some embodiments, the centrifugal pumps 48 can be coupled to the end rings 46 and/or the rotor assembly 24 in at least one of the coupling methods previously mentioned. In some embodiments, the rotor assembly 24, the end rings 46, and the centrifugal pumps 48 can be coupled together so that the centrifugal pumps 48 can rotate substantially synchronously with the rotor assembly 24. In some embodiments, the centrifugal pumps 48 can be configured and arranged so that, as the rotor assembly 24 rotates substantially within the stator assembly 26, portions of the centrifugal pumps 48 can contact at least a portion of the second coolant in the coolant sump 44. As a result, in some embodiments, when the electric machine 20 is in operation, the centrifugal pumps 48 can pull the second coolant from the coolant sump 44 and disperse and/or sling the second coolant throughout at least a portion of the machine cavity 22 where the second coolant can contact different elements of the module 10.

In some embodiments, the second coolant can be dispersed throughout portions of the machine cavity 22 via other methods. For example, in some embodiments, when the electric machine 20 is in operation, the moving rotor assembly 24 can create an area of localized low pressure substantially at or near the surface level of the second coolant in the coolant sump 44. For example, in some embodiments, the Bernoulli Effect can draw least a portion of the second coolant toward the rotor assembly 24. As a result, in some embodiments, when the second coolant contacts the rotor assembly 24, the second coolant can be carried by the rotor assembly 24 and can be centrifugally dispersed in a substantially radially and axially outward path throughout portions the machine cavity 22. In some embodiments, the dispersement of the second coolant can lead to contact with some elements of the module 10, such as, but not limited to the stator assembly 26, the stator end turns 28, and/or the bearings 30.

As shown in FIGS. 1 and 2, in some embodiments, the housing 14 can comprise an outer wall 50. Also, as shown in FIG. 2, in some embodiments, a plurality of coolant channels 52 can be located between the inner wall 17 and the outer wall 50. For example, in some embodiments, the housing 12 can be formed so that the coolant channels 52 are substantially integral with portions of the housing 12 (i.e., substantially between the inner wall 17 and the outer wall 50). In some embodiments, the coolant channels 52 can be located on at least both axial sides of the machine 20, and in other embodiments, the coolant channels 52 can be positioned in other configurations (e.g., on one axial side of the machine 20). Additionally, as shown in FIG. 2, in some embodiments, at least a portion of the coolant channels 52 can substantially circumscribe at least some of the bearings 30.

In some embodiments, the coolant channels 52 can be configured and arranged to at least partially aid in dispersing the second coolant. For example, in some embodiments, the coolant channels 52 can be in fluid communication with the coolant sump 44 through at least one sump inlet 54 and can extend throughout at least a portion of the housing 12. As shown in FIG. 2, in some embodiments, the module 10 can comprise more than one sump inlet 54 so that coolant channels 52 positioned on both axial sides of the electric machine 20 can fluidly connect to the coolant sump 44 via the sump inlets 54.

Figure 3:
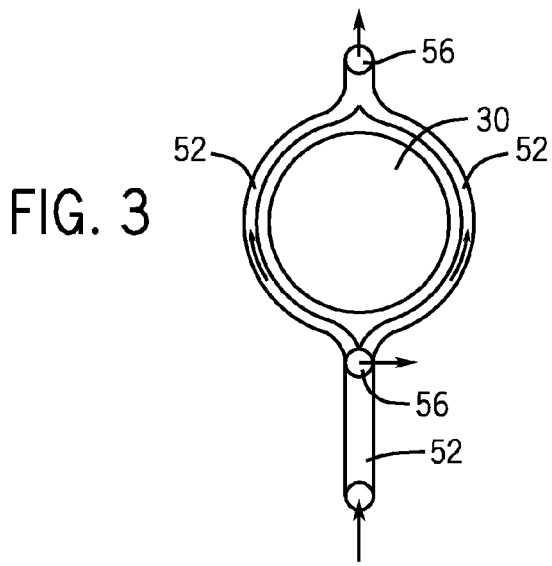
FIG. 3 is a side cross-sectional view of a coolant channel in the electric machine module of FIG. 2.

As shown in FIGS. 2 and 3, in some embodiments the coolant channels 52 can include a plurality of coolant apertures 56. For example, in some embodiments, the coolant apertures 56 can extend through the inner wall 17 so that the coolant channels 52 can be in fluid communication with the machine cavity 22. In some embodiments, the coolant apertures 56 can be positioned at different points along radial lengths of the inner wall 17. In some embodiments, the coolant apertures 56 can be positioned at substantially equivalent positions on the axial sides of the electric machine 20. In other embodiments, the coolant apertures 56 can be positioned at substantially non-equivalent positions on the axial sides of the electric machine 20.

In some embodiments, during operation of the electric machine 20, the movement of the rotor assembly 24 can cause a portion of the second coolant to move from the coolant sump 44 into the coolant channels 52 via at least one of the sump inlets 54. In some embodiments, the movement of the second coolant from the coolant sump 44 and into the coolant channels 52 can lead to electric machine cooling. For example, in some embodiments, the second coolant can flow through at least a portion of the coolant channels 52 in both generally axial and radial directions, as shown by the arrows in FIGS. 2 and 3. Moreover, in some embodiments, as the second coolant flows through the coolant channels 52, at least a portion of the second coolant can be dispersed into the machine cavity 22 through the coolant apertures 56. For example, in some embodiments, the coolant apertures 56 can be positioned so that the second coolant dispersed through the coolant apertures 56 can be directed toward the rotor assembly 24, as shown in FIGS. 2 and 3.

In some embodiments, after being directed out of the coolant apertures 56, the second coolant can contact at least a portion of the elements of the electric machine 20 and the housing 12. For example, in some embodiments, when the second coolant contacts some of the heat energy-generating elements of the electric machine 20, such as the rotor assembly 24, the rotor hub 32, and/or the stator assembly 26, including the stator end turns 28, the second coolant can provide cooling due to forced convection of heat energy from the components to the second coolant. Additionally, in some embodiments, the second coolant can provide some lubrication to the bearings 30 and other lubrication-requiring elements of the module 10.

According to some embodiments of the invention, relative to some conventional electric machines, the coolant sump 44, the coolant channels 52, and the second coolant can at least partially increase heat convection away from at least the stator end turns 28 and the rotor assembly 24 and can create a more effective way to sink heat energy into the coolant jacket 36. For example, in some embodiments, as the second coolant is dispersed through portions of the machine cavity 22, the second coolant can receive at least a portion of the heat energy produced by the stator end turns 28, the rotor assembly 24, and/or other elements of the module 10 through forced convection, as described above.

In some embodiments, after being dispersed through portions of the machine cavity 22, a portion of the second coolant can flow along the inner wall 17 and along other portions of the module 10, such as portions of the electric machine 20, back towards the coolant sump 44. As a result, in some embodiments, the second coolant can contact the inner wall 17, which can lead to heat energy transfer from the second coolant to the inner wall 17 before it reaches the coolant sump 44. The heat energy transferred to the inner wall 17 of the housing 12 can then be radiated to the surrounding environment, which can at least partially lead to module 10 cooling. In some embodiments, the second coolant be at an at least partially reduced temperature before it is recycled back into the coolant sump 44 because the second coolant transfers at least a portion of its heat energy to the housing 14. As a result, in some embodiments, the second coolant in the coolant sump 44 can be maintained at a lower temperature relative to other portions of the module 10 during operation of the electric machine 20. In some embodiments, because the second coolant within the coolant sump 44 can be at a generally lower temperature, the second coolant can remove additional heat energy from the electric machine module 10 when it is repeatedly dispersed through portions of the machine cavity 22 by the centrifugal pump 48 and/or the coolant channels 52 and coolant apertures 56.

In some embodiments, housing 12 can comprise at least one rib 58. For example, in some embodiments, the inner wall 17 can include at least one rib 58. In some embodiments, the inner wall 17 can comprise a plurality of ribs 58. Although future references are to "ribs," some embodiments can include one rib 58. In some embodiments, the ribs 58 can extend an axial distance from the inner wall 17 into the machine cavity 22. In some embodiments, the ribs 58 can be formed so that they are substantially integral with the inner wall 17. In some embodiments, the ribs 58 can be coupled to the inner wall 17 using any of the previously mentioned coupling techniques. In some embodiments, the ribs 58 can provide more surface area relative to a substantially planar inner wall, which can lead to greater heat energy transfer away from the second coolant, which can result in enhanced cooling of the electric machine module 10. In some embodiments, because of the positioning of the coolant jacket 36, the heat energy received by the housing 12 from the second coolant can be conducted to the coolant jacket 36 and the first coolant.

In some embodiments, the coolant sump 44 can be can be configured and arranged within the module 10 so that it is substantially adjacent to a portion of the coolant jacket 36 and the two elements are in thermal communication. For example, in some embodiments, at least a portion of the coolant sump 44 can be immediately adjacent to the coolant jacket 36. By way of example only, in some embodiments, the coolant sump 44 can be at least partially defined by an inner wall 17 of the sleeve member 14. As a result, in some embodiments, the sump 44 can be separated from the coolant jacket 36 by the thickness of the sleeve member 14. Accordingly, in some embodiments, at least a portion of the heat energy can be transferred from the coolant sump 44, through the sleeve member 14 and into the first coolant circulating through the coolant jacket 36. For example, in some embodiments, when the second coolant recycles to the coolant sump 44 (e.g., after being slung into the machine cavity 22 by the centrifugal pump 48 and/or the coolant channels 52 and coolant apertures 56), heat energy can be conducted from the second coolant in the coolant sump 44 through portions of the housing 12 (e.g., the sleeve member 14) to the coolant jacket 36 and the first coolant. As previously mentioned, in some embodiments, the first coolant can be directed out of the coolant jacket 36 to the heat transfer element, which can help remove the heat energy from the operating electric machine module 10. As a result, in some embodiments, the second coolant need not be directed out of the housing 12 in order for the heat energy to be transferred, which can result in enhanced cooling because the second coolant can be more readily recycled to other portions of the module 10.

Further, in some embodiments, when the second coolant comprises a vaporizable dielectric fluid or a vaporizable dielectric fluid/oil mixture rather than, for example, oil, heat-of-vaporization of the second coolant can increase heat transfer from the electric machine 20 components.

In some embodiments, at least a portion of the previously mentioned embodiments can at least partially increase durability and efficiency of the electric machine 20. For example, by increasing heat convection away from some elements of the module 10, including but not limited to the stator end turns 28 and the rotor assembly 24, and more effectively transferring heat energy into the first coolant in the coolant jacket 36, the coolant sump 44, and/or the coolant channels 52 with the second coolant can increase the continuous performance of and reduce the operating temperature of the electric machine 20, which can increase both durability and efficiency of the electric machine 20. In addition, in some embodiments, use of the coolant sump 44 and/or the coolant channels 52 can reduce the cooling requirements placed on the first coolant and the coolant jacket 36 to cool the electric machine 20. As a result, a necessary flow rate of the first coolant in the coolant jacket 36 can be reduced, which can increase efficiency of the electric machine module 10 (e.g., by reducing pumping losses to and from the fluid source), and an allowable coolant inlet temperature can be increased, which can reduce the required size of the heat transfer element and/or eliminate a need for the heat transfer element completely, thus reducing system costs of the electric machine module 10.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:
1. An electric machine module comprising:
a housing including a sleeve member coupled to at least one end cap,
an inner wall of the housing at least partially defining a machine cavity,
at least a portion of the inner wall configured and arranged to define at least a portion of a coolant sump, and
at least one coolant channel positioned between the inner wall and an outer wall of the housing, wherein the at least one coolant channel is in fluid communication with the coolant sump and is configured and arranged to contain a second coolant fluidly isolated from a first coolant;
an electric machine positioned in the machine cavity and at least partially enclosed by the housing, the electric machine including a stator assembly including a stator, stator end turns and a rotor assembly; and
a coolant jacket at least partially defined by the housing, the coolant jacket positioned so that it circumscribes the stator assembly and the coolant sump and extends substantially continuously across a length of the stator assembly that includes at least a partial axial length of the stator end turns adjacent each axial end, the coolant jacket configured and arranged to contain the first coolant fluidly substantially continuously across a length of the stator assembly that includes at least a partial axial length of the stator end turns; and wherein the first coolant is fluidly isolated from the second coolant.

2. The electric machine module of claim 1 and further comprising at least one coolant aperture positioned through a portion of the inner wall so that the at least one coolant channel is in fluid communication with the machine cavity.

3. The electric machine module of claim 2, wherein the at least one coolant aperture is substantially adjacent to a portion of the rotor assembly.

4. The electric machine module of claim 1, wherein the inner wall comprises at least one rib.

5. The electric machine module of claim 1, wherein the coolant jacket is configured and arranged to contain a portion of a first coolant and the coolant sump is configured and arranged to contain a portion of a second coolant.

6. The electric machine module of claim 5, wherein the first coolant comprises at least one of a transmission fluid, ethylene glycol, and water.

7. The electric machine module of claim 5, wherein the second coolant comprises at least one of an oil and a vaporizable dielectric fluid.

8. The electric machine module of claim 1, wherein at least a portion of the coolant sump is immediately adjacent to at least a portion of the coolant jacket.

9. The electric machine module of claim 1 and further comprising at least one end ring and at least one centrifugal pump coupled to an axial end of the rotor assembly.

10. The electric machine module of claim 1 and further comprising at least one bearing, wherein the at least one coolant channel at least partially circumscribes a portion of the at least one bearing.

11. An electric machine module comprising:
 a housing including a sleeve member coupled to at least one end cap,
  an inner wall of the housing at least partially defining a machine cavity,
  at least a portion of the inner wall configured and arranged to define at least a portion of a coolant sump, the coolant sump configured and arranged to contain at least a portion of a second coolant
  at least one coolant channel positioned between the inner wall and an outer wall of the housing, wherein the at least one coolant channel in fluid communication with the coolant sump via a coolant inlet and configured and arranged to contain a second coolant fluidly isolated from a first coolant, and
  at least one coolant aperture positioned through a portion of the inner wall so that the at least one coolant channel is in fluid communication with the machine cavity;
 an electric machine positioned in the machine cavity and at least partially enclosed by the housing, the electric machine including a stator assembly including stator end turns and a rotor assembly;
 an outer member coupled to at least a portion of the housing; and
 a coolant jacket defined between at least a portion of an inner perimeter of the outer member and an outer perimeter of the sleeve member and extending substantially continuously across a length of the stator assembly that includes at least a partial axial length of the stator end turns adjacent each axial end, the coolant jacket configured and arranged to contain a first coolant fluidly isolated from the second coolant and extending substantially continuously across a length of the stator assembly that includes at least a partial axial length of the stator end turns; and wherein the coolant jacket circumscribes the coolant sump and the stator assembly; and wherein at least a portion of the coolant sump is fluidly isolated from but in thermal communication with at least a portion of the coolant jacket.

12. The electric machine module of claim 11 and further comprising at least one rib coupled to the inner wall.

13. The electric machine module of claim 11 and further comprising at least one end ring and at least one centrifugal pump coupled to at least one axial face of the rotor assembly.

14. The electric machine module of claim 13, wherein the at least one centrifugal pump is configured and arranged to disperse at least a portion of the second coolant to at least a portion of the machine cavity.

15. The electric machine module of claim 11 and further comprising at least one bearing, wherein the at least one coolant channel at least partially circumscribes a portion of the at least one bearing.

16. The electric machine module of claim 11, wherein the at least one coolant aperture is positioned substantially adjacent to a portion of the rotor assembly.

17. The electric machine module of claim 11 wherein the first coolant comprises at least one of a transmission fluid, ethylene glycol, and water.

18. The electric machine module of claim 11, wherein the second coolant comprises at least one of an oil and a vaporizable dielectric fluid.

19. A method of cooling an electric machine module, the method comprising:
 providing a housing including a sleeve member coupled to at least one end cap, an inner wall of the housing at least partially defining a machine cavity,
 providing at least one coolant sump within the housing, at least a portion of the inner wall configured and arranged to define at least a portion of the coolant sump;
 positioning at least one coolant channel between the inner wall and an outer wall of the housing so that the at least one coolant channel in fluid communication with the coolant sump;
 positioning an electric machine in the machine cavity, the electric machine including a stator assembly including stator end turns and a rotor assembly; and
 providing a coolant jacket at least partially defined by the housing, the coolant jacket positioned so that it circumscribes the stator assembly and the coolant sump and extends substantially continuously across a length of the stator assembly that includes at least a partial axial length of the stator end turns adjacent each axial end; and
wherein the coolant jacket is fluidly isolated from the at least one coolant channel;
 and wherein at least a portion of the coolant jacket is fluidly isolated from but in thermal communication with at least a portion of the coolant sump; and
 wherein the coolant jacket configured and arranged to contain a coolant fluidly substantially continuously across a length of the stator assembly that includes at least a partial axial length of the stator end turns.

20. The method of claim 19, and further comprising positioning at least one coolant aperture through the inner wall so that it is substantially adjacent to at least a portion of the rotor assembly.

* * * * *